(12) United States Patent
Heo et al.

(10) Patent No.: US 11,462,233 B2
(45) Date of Patent: Oct. 4, 2022

(54) ELECTRONIC DEVICE AND METHOD OF RECOGNIZING AUDIO SCENE

(71) Applicant: SAMSUNG ELECTRONICS CO., LTD., Suwon-si (KR)

(72) Inventors: Hoon Heo, Suwon-si (KR); Sunmin Kim, Suwon-si (KR); Kiwoong Kang, Suwon-si (KR); Kibeom Kim, Suwon-si (KR); Inwoo Hwang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 35 days.

(21) Appl. No.: 16/685,479

(22) Filed: Nov. 15, 2019

(65) Prior Publication Data

US 2020/0160878 A1     May 21, 2020

(30) Foreign Application Priority Data

Nov. 16, 2018   (KR) .................. 10-2018-0141961

(51) Int. Cl.
*G10L 25/60*      (2013.01)
*G10L 25/81*      (2013.01)
(Continued)

(52) U.S. Cl.
CPC .............. *G10L 25/30* (2013.01); *G10L 25/81* (2013.01); *G10L 25/84* (2013.01); *H04R 5/04* (2013.01); *G10L 2025/783* (2013.01)

(58) Field of Classification Search
None
See application file for complete search history.

(56) References Cited

U.S. PATENT DOCUMENTS

| 9,613,640 B1 | 4/2017 | Balamurali et al. |
| 2007/0083365 A1 | 4/2007 | Shmunk |

(Continued)

FOREIGN PATENT DOCUMENTS

| KR | 10-2009-0017109 A | 2/2009 |
| KR | 1020170124854 A | 11/2017 |

OTHER PUBLICATIONS

Yoonchang Han, Jeongsoo Park, Kyogu Lee; Convolutional Neural Networks With Binaural Representations and Background Subtraction for Acoustic Scene Classification ; Nov. 16, 2017 URL: https://www.cs.tut.fi/sgn/arg/dcase2017/documents/challenge_technical_reports/DCASE2017_Han_207.pdf (Year: 2017).*

(Continued)

*Primary Examiner* — Richa Mishra
(74) *Attorney, Agent, or Firm* — Sughrue Mion, PLLC

(57) ABSTRACT

An electronic device and method of recognizing an audio scene are provided. The method of recognizing an audio scene includes: separating, according to a predetermined criterion, an input audio signal into channels; recognizing, according to each of the separated channels, at least one audio scene from the input audio signal by using a plurality of neural networks trained to recognize an audio scene; and determining, based on a result of the recognizing of the at least one audio scene, at least one audio scene included in audio content by using a neural network trained to combine audio scene recognition results for respective channels, wherein the plurality of neural networks includes: a first neural network trained to recognize the audio scene based on a time-frequency shape of an audio signal, a second neural network trained to recognize the audio scene based on a shape of a spectral envelope of the audio signal, and a third neural network trained to recognize the audio scene based on a feature vector extracted from the audio signal.

14 Claims, 14 Drawing Sheets

(51) Int. Cl.
*G10L 25/84* (2013.01)
*G10L 25/78* (2013.01)
*H04R 5/04* (2006.01)
*G10L 25/30* (2013.01)

(56) References Cited

U.S. PATENT DOCUMENTS

| | | | |
|---|---|---|---|
| 2015/0120291 A1* | 4/2015 | Xue | G10L 15/20 704/231 |
| 2017/0061966 A1* | 3/2017 | Marcheret | G06K 9/00718 |
| 2017/0061969 A1 | 3/2017 | Thornburg et al. | |
| 2017/0092297 A1 | 3/2017 | Sainath et al. | |
| 2017/0193362 A1 | 7/2017 | Cremer et al. | |
| 2018/0063662 A1* | 3/2018 | Briand | H04S 7/307 |

OTHER PUBLICATIONS

Sharath Adavanne, Giambattista Parascandolo, Pasi Pertila, Toni Heittola, Tuomas Virtanen; Sound Event Detection in Multichannel Audio Using Spatial and Harmonic Features; Jun. 2017 URL:https://arxiv.org/pdf/1706.02293.pdf (Year: 2017).*

Emre C, aklr, Giambattista Parascandolo, Toni Heittola, Heikki Huttunen, and Tuomas Virtanen; Convolutional Recurrent Neural Networks for Polyphonic Sound Event Detection; Pages: All; Feb. 21, 2017 (Year: 2017).*

Communication dated Mar. 10, 2020 issued by the European Patent Office in European Application No. 19209412.6.

International Search Report and Written Opinion (PCT/ISA/210 & 237) dated Mar. 2, 2020 issued by the International Searching Authority in International Application No. PCT/KR2019/015710.

Yoonchang Han, et al., "Convolutional Neural Networks with Binaural Representations and Background Subtraction for Acoustic Scene Classification", Detection and Classification of Acoustic Scenes and Events 2017, Nov. 16, 2017, XP055672095, pp. 1-5.

Weiping Zheng, et al., "CNNs-based Acoustic Scene Classification using Multi-Spectrogram Fusion and Label Expansions", Journal of Latex Class Files, vol. 14, No. 8, Aug. 2015, arXiv:1809.01543v1 [cs.CV], Sep. 5, 2018, XP081187524, pp. 1-7.

Soo Hyun Bae, et al., "Acoustic Scene Classification Using Parallel Combination of LSTM and CNN", Detection and Classification of Acoustic Scenes and Events 2016, Sep. 3, 2016, XP055579570, pp. 1-5.

* cited by examiner

ELECTRONIC DEVICE AND METHOD OF RECOGNIZING AUDIO SCENE

CROSS-REFERENCE TO RELATED APPLICATION(S)

This application is based on and claims priority under 35 U.S.C. § 119 to Korean Patent Application No. 10-2018-0141961, filed on Nov. 16, 2018, in the Korean Intellectual Property Office, the disclosure of which is incorporated by reference herein in its entirety.

BACKGROUND

1. Field

The disclosure relates to an electronic device and method of recognizing an audio scene, and more particularly, to an electronic device and method of recognizing an audio scene by using a plurality of neural networks trained to recognize an audio scene.

2. Description of Related Art

A display device includes a function of displaying images to a user. The user may view a broadcast program on the display device. The display device displays a broadcast program selected by the user from among broadcast programs transmitted from broadcasting stations. The recent trend in broadcasting is a worldwide shift from analog broadcasting to digital broadcasting.

Digital broadcasting refers to broadcasting digital video and audio signals. Digital broadcasting offers many advantages over analog broadcasting, such as robustness against external noise, less data loss, ease of error correction, and the ability to provide high-definition, clear images. Digital broadcasting also allows interactive viewer services, compared to analog broadcasting.

Further, smart televisions (TVs), which have become popular, provide various types of content in addition to the digital broadcasting function. Smart TVs are designed to analyze and provide what users want without the users' intervention, instead of passively operating according to the users' selection.

When a user views a broadcast program or various types of content on a display device by using a speaker, a sound bar, or the like, sound delivery as well as representation of images in the content is important.

In recent years, there has been demand for research into a method of accurately recognizing an audio scene by effectively analyzing audio content, for effective execution of various functions related to audio signals.

SUMMARY

Provided are an electronic device for recognizing an audio scene, and a method therefor.

Additional aspects will be set forth in part in the description which follows and, in part, will be apparent from the description, or may be learned by practice of the presented embodiments.

In accordance with an aspect of the disclosure, a method of recognizing an audio scene includes: separating, according to a predetermined criterion, an input audio signal into channels; recognizing, according to each of the separated channels, at least one audio scene from the input audio signal by using a plurality of neural networks trained to recognize an audio scene; and determining, based on a result of the recognizing of the at least one audio scene, at least one audio scene included in audio content by using a neural network trained to combine audio scene recognition results for respective channels, wherein the plurality of neural networks includes: a first neural network trained to recognize the audio scene based on a time-frequency shape of an audio signal, a second neural network trained to recognize the audio scene based on a shape of a spectral envelope of the audio signal, and a third neural network trained to recognize the audio scene based on a feature vector extracted from the audio signal.

The separating may include separating the input audio signal into a mid channel and a side channel.

The separating may include configuring recognition of a predetermined audio scene in each of the separated channels.

The separating may include preprocessing the input audio signal into an input data format of each of the plurality of neural networks trained to recognize the audio scene.

The preprocessing may include processing the input audio signal into the input data format of the first neutral network and the input data format of the third neural network by downsampling the input audio signal and converting the downsampled audio signal into a time and frequency-based spectrogram.

The preprocessing may include processing the input audio signal into the input data format of the second neural network by reducing a dimensionality of the shape of the spectral envelope of the input audio signal to a low dimension.

The recognizing the at least one audio scene may include calculating a probability for each of the recognized at least one audio scene according to each of the separated channels.

The recognizing the at least one audio scene may include calculating a probability of being the at least one audio scene based on a spectral envelope of a size adjusted by applying a predetermined weight to a spectral envelope preprocessed into an input data format of the second neural network.

The feature vector may include at least one of a dominant vector, a mean spectrum power, monophony, or a spectral zero-crossing rate.

The determining the at least one audio scene may include calculating a probability for each of the at least one audio scene included in the audio content based on the probability of each of the at least one audio scene, calculated for each of the channels that are separated to a mid channel and a side channel.

In accordance with another aspect of the disclosure, an electronic device for recognizing an audio scene, includes: a memory storing at least one instruction; and at least one processor configured to execute the at least one instruction to implement: a preprocessing module configured to separate, according to a predetermined criterion, an input audio signal into channels; a scene recognition module configured to recognize, according to each of the separated channels, at least one audio scene from the input audio signal by using a plurality of neural networks trained to recognize an audio scene; and a decision module configured to determine, based on the recognized at least one audio scene, at least one audio scene included in audio content by using a neural network trained to combine audio scene recognition results for respective channels, wherein the plurality of neural networks includes: a first neural network trained to recognize the audio scene based on a time-frequency shape of an audio signal, a second neural network trained to recognize the audio scene based on a shape of a spectral envelope of the audio signal, and a third neural network trained to recognize the audio scene based on a feature vector extracted from the audio signal.

The preprocessing module may be further configured to separate the input audio signal into a mid channel and a side channel.

The preprocessing module may be further configured to configure recognition of a predetermined audio scene in each of the separated channels.

The preprocessing module may be further configured to preprocess the input audio signal into an input data format of each of the plurality of neural networks trained to recognize the audio scene.

The preprocessing module may be further configured to process the input audio signal into the input data format of the first neural network and the input data format of the third neural network by downsampling the input audio signal and converting the downsampled audio signal into a time and frequency-based spectrogram.

The preprocessing module may be further configured to process the input audio signal into the input data format of the second neural network by reducing a dimensionality of the shape of the spectral envelope of the input audio signal to a low dimension.

The scene recognition module may be further configured to calculate a probability for each of the recognized at least one audio scene according to each of the separated channels.

The feature vector may include at least one of a dominant vector, a mean spectrum power, monophony, or a spectral zero-crossing rate.

The decision module may be further configured to calculate a probability for each of the at least one audio scene included in the audio content based on the probability for each of the at least one audio scene, calculated for each of the channels that are separated to a mid channel and a side channel.

In accordance with another aspect of the disclosure, a non-transitory computer-readable recording medium has recorded thereon a program executable by at least one processor to perform the method of recognizing at least one audio scene.

In accordance with another aspect of the disclosure, a method of recognizing an audio scene includes: recognizing at least one audio scene of an audio signal by using a plurality of neural networks trained to recognize an audio scene; and determining, based on a result of the recognizing of the at least one audio scene, at least one audio scene included in audio content by using a neural network trained to combine audio scene recognition results, wherein the plurality of neural networks includes: a first neural network trained to recognize the audio scene based on a time-frequency shape of an audio signal, a second neural network trained to recognize the audio scene based on a shape of a spectral envelope of the audio signal, and a third neural network trained to recognize the audio scene based on a feature vector extracted from the audio signal.

The method may further include preprocessing the audio signal into an input data format of each of the plurality of neural networks trained to recognize the audio scene.

The preprocessing may include processing the input audio signal into the input data format of the first neutral network and the input data format of the third neural network by downsampling the input audio signal and converting the downsampled audio signal into a time and frequency-based spectrogram.

The preprocessing may include processing the input audio signal into the input data format of the second neural network by reducing a dimensionality of the shape of the spectral envelope of the input audio signal to a low dimension.

The recognizing the at least one audio scene may include calculating a probability of being the at least one audio scene based on a spectral envelope of a size adjusted by applying a predetermined weight to a spectral envelope preprocessed into an input data format of the second neural network.

The feature vector may include at least one of a dominant vector, a mean spectrum power, monophony, or a spectral zero-crossing rate.

The determining the at least one audio scene may include calculating a probability for each of the at least one audio scene included in the audio content based on the probability of each of the at least one audio scene, calculated for each of a mid channel and a side channel.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
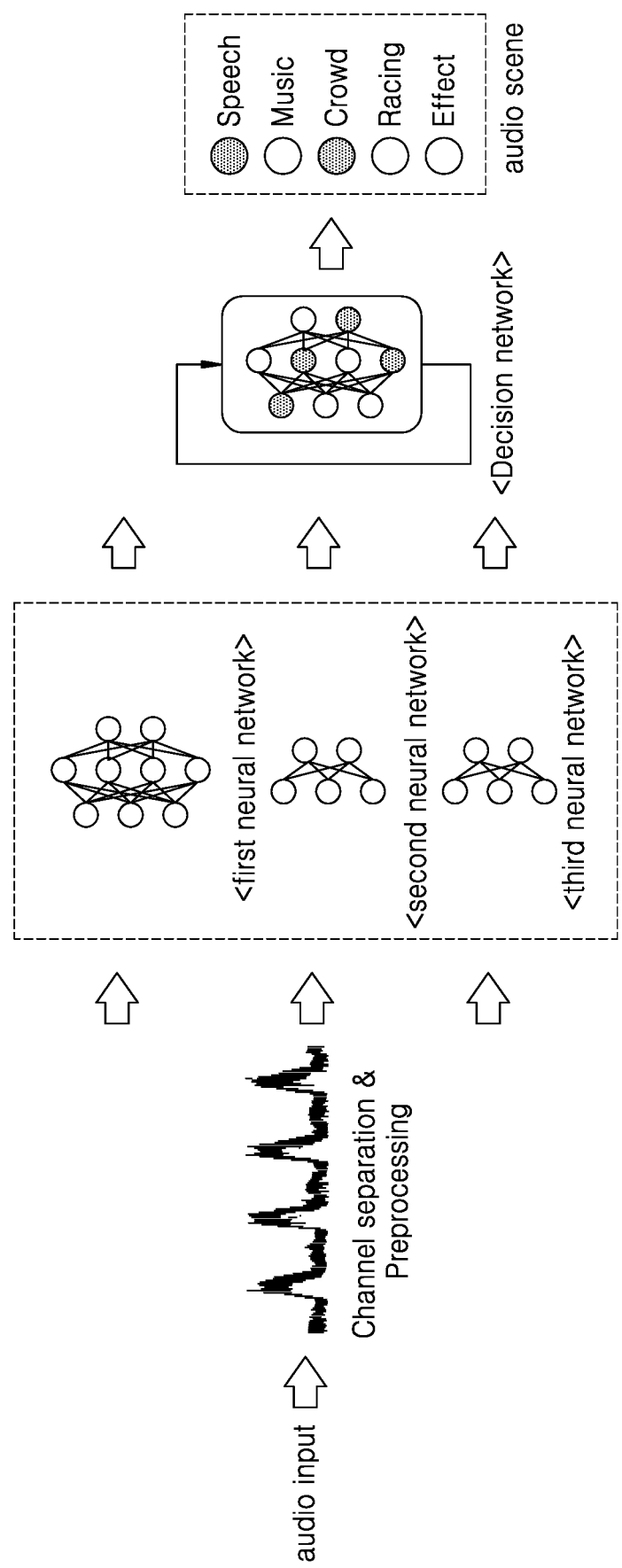
FIG. 1 is a diagram illustrating an embodiment.

Embodiments are described in detail herein with reference to the accompanying drawings so that this disclosure may be easily performed by those of ordinary skill in the art. However, the disclosure may be embodied in many different ways, and is not limited to embodiments set forth herein. In the drawings, like reference numerals denote the same elements throughout the disclosure.

Although general terms widely used at present are selected for describing the disclosure in consideration of the functions thereof, these general terms may vary according to intent of a person of ordinary skill in the art, case precedents, the advent of new technologies, and the like. Hence, the terms should be defined based on their meanings and the contents of the entire specification, not by simply stating the terms.

It will be understood that although the terms "first," "second," etc., may be used herein to describe various components, these components should not be limited by these terms. These terms are only used to distinguish one component from another.

The terms used in the disclosure are merely used to describe certain embodiments, and are not intended to limit the disclosure. It is to be understood that a singular form of a noun corresponding to an item may include one or more of the things, unless the relevant context clearly indicates otherwise. When an element is referred to as "coupled with," "coupled to," "connected with," or "connected to" another element, it means that the element may be coupled with the other element "directly" or "electrically" via a third element in between. In addition, the terms "comprises" and/or "comprising" or "includes" and/or "including," when used in this specification, specify the presence of stated elements, but do not preclude the presence or addition of one or more other elements.

The use of the terms "a," "an," "the," and similar referents in the context of describing the disclosure, especially in the context of the following claims, are to be construed to cover both the singular and the plural. Also, the steps of all methods described herein may be performed in any suitable order unless otherwise indicated herein or otherwise clearly contradicted by context. The disclosure is not limited to the described order of the operations.

Hereinafter, expressions such as "at least one of A [and/or] B," or "one or more of A [and/or] B," include all possible combinations of the listed items. For example, "at least one of A and B," or "at least one of A or B" includes any of (1) at least one A, (2) at least one B, or (3) at least one A and at least one B.

The expression "according to some embodiments" or "according to an embodiment" used in the entire disclosure does not necessarily indicate the same embodiment of the disclosure.

The aforementioned embodiments of the disclosure may be described in terms of functional block components and various processing operations. Some or all of such functional blocks may be realized by any number of hardware and/or software components configured to perform the specified functions. For example, functional blocks according to the disclosure may be realized by one or more microprocessors or by circuit components for a predetermined function. In addition, for example, functional blocks according to the disclosure may be implemented with any programming or scripting language. The functional blocks may be implemented in algorithms that are executed on one or more processors. Furthermore, the disclosure described herein may employ any number of techniques according to the related art for electronics configuration, signal processing and/or control, data processing and the like. The words "mechanism," "element," "means," and "configuration" are used broadly and are not limited to mechanical or physical embodiments of the disclosure.

Furthermore, the connecting lines or connectors between components shown in the various figures presented are intended to represent exemplary functional relationships and/or physical or logical couplings between the components. Connections between components may be represented by many alternative or additional functional relationships, physical connections or logical connections in a practical device.

With reference to the attached drawings, certain embodiments will be described below in detail.

FIG. 1 is a diagram illustrating an embodiment.

According to an embodiment, an electronic device 100 (as shown, for example, in FIGS. 10 and 11) may recognize at least one audio scene included in audio content and classify the audio content into audio scenes.

According to an embodiment, an audio scene may refer to a unit classified based on a plurality of sound sources included in the audio content. The audio content may be classified into audio scenes including speech, music, effect sound, and so on.

In broadcast sports content, for example, a broadcast sports scene may include two main sound sources: a commentator's speech and crowd sound. According to an embodiment, the electronic device 100 may recognize audio scenes containing the commentator's speech and the crowd sound, and classify the audio scenes, by analyzing an audio signal.

According to an embodiment, the electronic device 100 may recognize at least one audio scene from an input audio signal by using a plurality of neural networks trained to recognize audio scenes.

According to an embodiment, the plurality of neural networks may include a first neural network trained to recognize an audio scene based on the time-frequency shape of an audio signal, a second neural network trained to recognize an audio scene based on the shape of the spectral envelope of an audio signal, and a third neural network trained to recognize an audio scene based on a feature vector extracted from an audio signal.

A neural network may be constructed in consideration of application fields of a trained model, the purpose of training, or the computer capability of a device. For example, the trained model may be, but is not limited to, a convolutional neural network (CCN), a deep neural network (DNN), a recurrent neural network (RNN), or a bidirectional recurrent neural network (BiRNN).

For example, the first neural network trained to recognize an audio scene based on a time-frequency shape of an audio signal may be configured as a CNN. The second neural network trained to recognize an audio scene based on a shape of the spectral envelope of an audio signal may be configured as a DNN. The third neural network trained to recognize an audio scene based on a feature vector extracted from an audio signal may be configured as a DNN.

Further, a neural network trained to combine audio scene recognition results for respective channels may be configured as an RNN.

As illustrated in FIG. 1, upon input of an audio signal, the electronic device 100 according to an embodiment may separate the input audio signal into channels (channel separation). Further, the electronic device 100 may preprocess the audio signal into an input data format of each neural network. The electronic device 100 may provide the preprocessed audio signal to at least one of a plurality of neural networks (e.g., the first neural network, the second neural network, and the third neural network) trained to recognize an audio scene.

Further, according to an embodiment, the electronic device 100 may determine at least one audio scene (for example, speech and crowd sound) included in audio content on a separated channel-by-channel basis, based on audio scene recognition results output from the plurality of neural networks by using the neural network (decision network) trained to combine audio scene recognition results for respective channels.

According to an embodiment, the electronic device 100 may determine an appropriate time at which multiple functions to be executed based on an audio scene are activated by recognizing the audio scene included in the audio content. That is, highly accurate audio scene recognition may prevent execution of functions at an inappropriate time. For example, the electronic device 100 may apply a sound effect of enhancing a sense of presence by accurately recognizing a period of crowd sound in the audio content.

Further, according to an embodiment, the electronic device 100 may collect a reproduction history by recognizing an audio scene included in the audio content, and use the collected reproduction history in providing a user-customized function.

Additionally, according to an embodiment, the electronic device 100 may recognize various types of audio scenes in real time on the electronic device 100. That is, because data is processed on the electronic device 100 without being transmitted and received to and from an external computing device such as a cloud server, the electronic device 100 may operate fast without an additional delay in data transmission and reception, and also without connection to the Internet.

Figure 2:
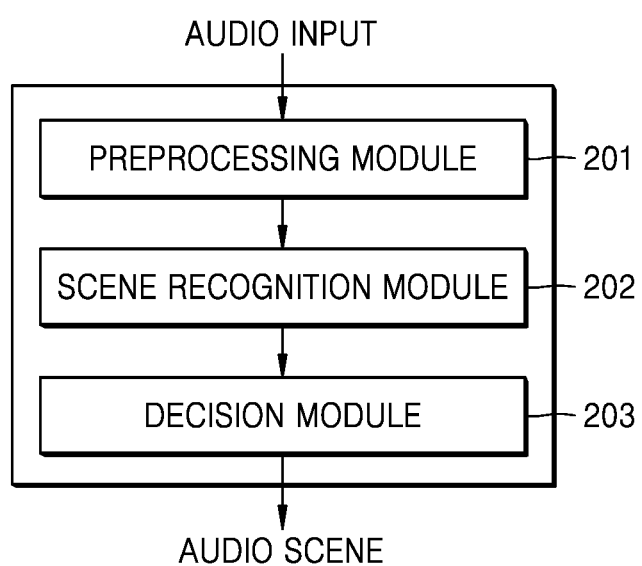
FIG. 2 is a block diagram for describing an operation of an electronic device according to an embodiment.
Figure 3:
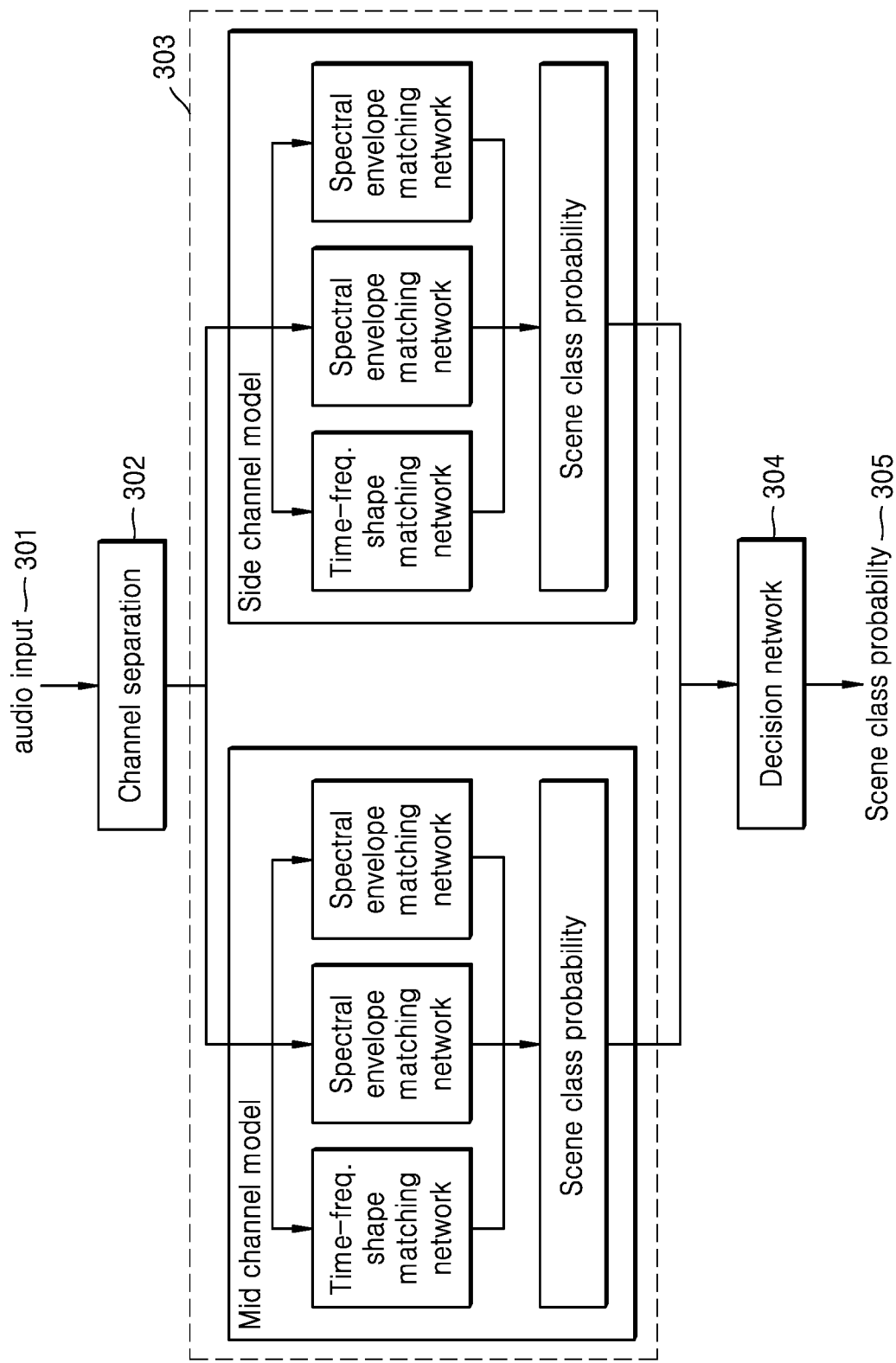
FIG. 3 is a block diagram for describing an operation of an electronic device according to an embodiment.

FIGS. 2 and 3 are block diagrams referred to for describing an operation of an electronic device 100 according to one or more embodiments.

Referring to FIG. 2, the electronic device 100 according to an embodiment may include a preprocessing module 201, a scene recognition module 202, and a decision module 203.

The preprocessing module 201 may preprocess an input audio signal into an input data format suitable for processing in the scene recognition module 202.

The scene recognition module 202 may recognize an audio scene in the audio signal by using at least one neural network.

The decision module 203 may determine at least one audio scene included in audio content based on obtained audio scene recognition results for the respective channels.

A specific operation of each module according to an embodiment will be described with reference to FIG. 3.

Referring to FIG. 3, the preprocessing module 201 may receive a stereo audio signal (301) and separate the received stereo audio signal into a mid channel and a side channel (channel separation) (302).

The mid channel may be the sum of a left channel and a right channel of the stereo audio signal, and the side channel may be the difference between the left channel and the right channel.

The scene recognition module 202 may recognize at least one audio scene by using a plurality of neural networks trained to recognize an audio scene on each of the mid channel and the side channel of the audio signal (303).

The plurality of neural networks may include a first neural network trained to recognize an audio scene based on the time-frequency shape of an audio signal (a time-frequency shape matching network), a second neural network trained to recognize an audio scene based on the shape of the spectral envelope of an audio signal (a spectral envelope matching network), and a third neural network trained to recognize an audio scene based on a feature vector extracted from an audio signal (an acoustic feature matching network).

Further, the scene recognition module 202 may calculate a probability of being at least one audio scene (scene class probability) for each separated channel.

The electronic device 100 may calculate a probability for each audio scene by passing audio scene recognition results, which have been obtained by using the plurality of neural networks (e.g., the first neural network, the second neural network, and the third neural network) trained to recognize an audio scene, through a feedforward neural network.

Further, according to an embodiment, the decision module 203 may calculate a probability for each of at least one audio scene included in the audio content (305) by inputting the audio scene recognition results for the respective channels to a neural network trained to combine audio scene recognition results for respective channels (a decision network) (304).

Figure 4:
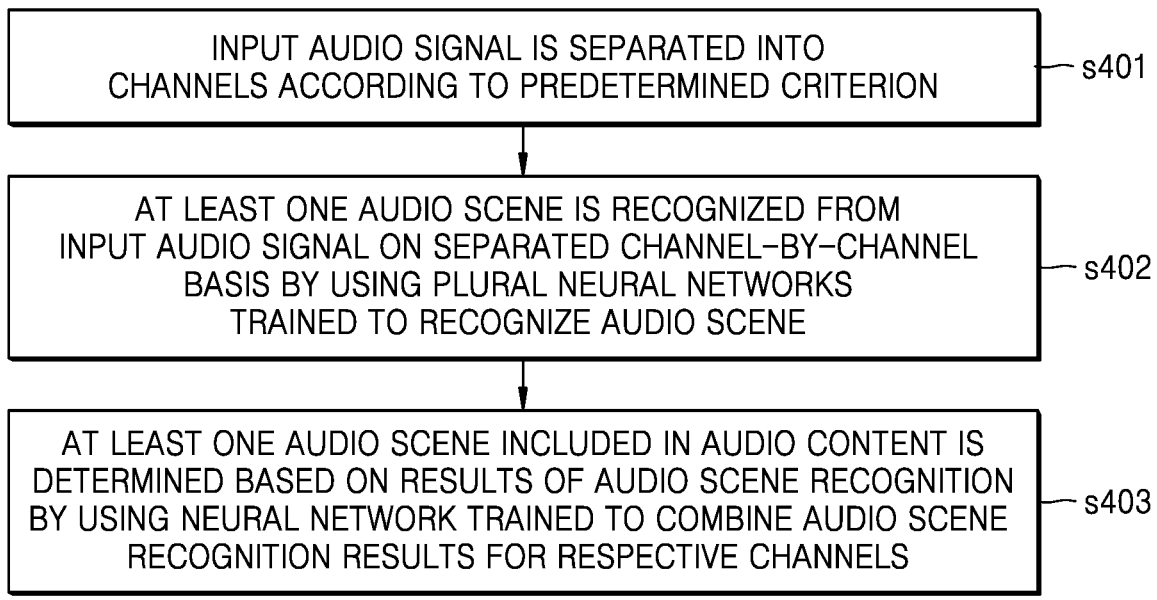
FIG. 4 is a flowchart illustrating an operation method of an electronic device, according to an embodiment.

FIG. 4 is a flowchart illustrating an operation method of an electronic device 100 according to an embodiment.

Referring to FIG. 4, the electronic device 100 may separate an input audio signal into channels according to a predetermined criterion in operation S401.

For example, the electronic device 100 may separate an input stereo audio signal into a mid channel and a side channel. The mid channel may be the sum of a left channel and a right channel of the stereo audio signal, and the side channel may be the difference between the left channel and the right channel.

In operation S402, the electronic device 100 may recognize at least one audio scene from the input audio signal according to each of the separated channels by using a plurality of neural networks trained to recognize an audio scene.

According to an embodiment, the plurality of neural networks may include a first neural network trained to recognize an audio scene based on the time-frequency shape of an audio signal (a time-frequency shape matching network), a second neural network trained to recognize an audio scene based on the shape of the spectral envelope of an audio signal (a spectral envelope matching network), and a third neural network trained to recognize an audio scene based on a feature vector extracted from an audio signal (an acoustic feature matching network).

The electronic device 100 may calculate a probability for each of at least one audio scene, for each of the channels that are separated to the mid channel and the side channel.

In operation S403, the electronic device 100 may determine, based on a result of the recognizing of the at least one audio scene, at least one audio scene included in audio content by using a neural network trained to combine audio scene recognition results for respective channels.

The electronic device 100 may determine a probability for each of the at least one audio scene included in the audio content by inputting an audio scene recognition result output from each of the mid channel and the side channel to the neural network trained to combine audio scene recognition results for respective channels.

Figure 5:
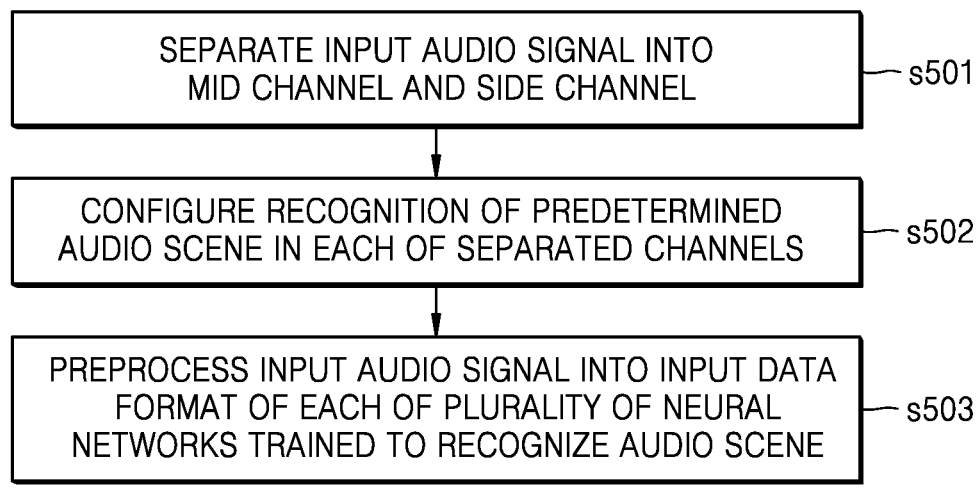
FIG. 5 is a flowchart illustrating a method of preprocessing an audio signal in an electronic device, according to an embodiment.

FIG. 5 is a flowchart illustrating a method of preprocessing an audio signal in an electronic device 100 before the electronic device 100 inputs the audio signal to a plurality of neural networks trained to recognize an audio scene, according to an embodiment.

Referring to FIG. 5, the electronic device 100 may separate an input audio signal into a mid channel and a side channel in operation S501. Operation S501 is the same as or substantially similar to operation S401 in FIG. 4.

Further, the electronic device 100 may be configured to recognize a predetermined audio scene in each of the separated channels in operation S502.

In broadcast sports content, for example, a commentator's speech is equally on a left channel and a right channel and, in many cases, is not on the side channel. A scene in which an emphasis is put on a sense of surrounding such as crowd sound may be on the side channel. Recognition of a predetermined audio scene in each channel may be configured, wherein speech is recognized from the mid channel and crowd sound is recognized from the side channel, between the separated channels.

According to an embodiment, the recognition accuracy of audio scenes may be increased by allocating a predetermined audio scene to be recognized to each channel.

Further, in operation S503 of FIG. 5, the electronic device 100 may preprocess the input audio signal into an input data format of each of the plurality of neural networks trained to recognize an audio scene.

According to an embodiment, the electronic device 100 may convert the audio signal to a format suitable for an input to each neural network. For example, because the first neural network trained to recognize an audio scene based on the time-frequency shape of an audio signal and the third neural network trained to recognize an audio scene based on a feature vector extracted from an audio signal require a high resolution for a frequency band of up to 3 kHz, the electronic device 100 may downsample the original signal and convert the downsampled signal to a spectrogram which is a two-dimensional (2D) time-frequency representation, by preprocessing.

Further, because the second neural network trained to recognize an audio signal based on the shape of the spectral envelope of an audio signal requires low-dimensional spectral energy for efficient calculation, the electronic device 100 may reduce multi-dimensional spectral energy at up to 24 kHz into low dimensional spectral energy by passing the multi-dimensional spectral energy through a mel-scale filterbank.

Figure 6:
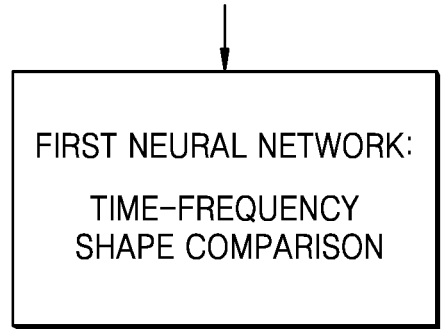
FIG. 6 is a diagram illustrating a method of recognizing an audio scene from an audio signal by using a plurality of neural networks in an electronic device, according to an embodiment.
Figure 7:
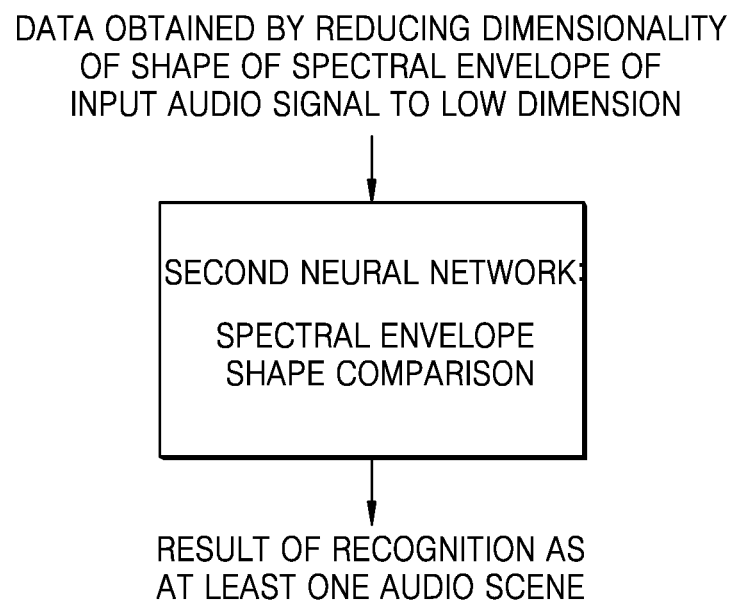
FIG. 7 is a diagram illustrating a method of recognizing an audio scene from an audio signal by using a plurality of neural networks in an electronic device, according to an embodiment.
Figure 8:
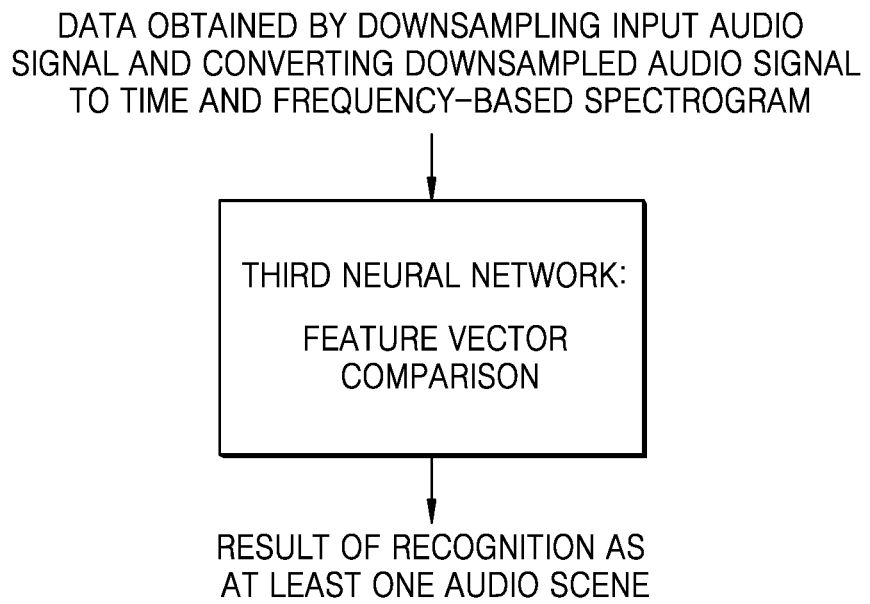
FIG. 8 is a diagram illustrating a method of recognizing an audio scene from an audio signal by using a plurality of neural networks in an electronic device, according to an embodiment.

FIGS. 6 to 8 are diagrams illustrating methods of recognizing an audio scene from an audio signal by using a plurality of neural networks in an electronic device 100, according to one or more embodiments.

Referring to FIG. 6, the electronic device 100 according to an embodiment may recognize an audio scene from an audio signal by using a first neural network.

The electronic device 100 may recognize an audio scene by using the first neural network, based on data preprocessed into the input data format of the first neural network, that is, data obtained by downsampling an input audio signal and converting the downsampled audio signal into a time and frequency-based spectrogram.

The first neural network may be a CNN receiving the spectrogram that is a 2D time-frequency representation of the audio signal and calculating a probability of the spectrogram matching each audio scene.

According to an embodiment, the first neural network may operate faster on the electronic device 100 and obtain a recognition result in real time by setting the layer depth of the first neural network to 1.

The first neural network may effectively learn a 2D convolutional kernel representing a pattern of lines and curves frequently observed in an audio spectrogram by using kernel initialization in a learning stage of the first neural network.

Further, as illustrated in FIG. 7, the electronic device 100 may recognize an audio scene from an audio signal by using a second neural network.

The electronic device 100 may recognize an audio scene by using the second neural network, based on data preprocessed into the input data format of the second neural network, that is, data obtained by reducing the dimensionality of the shape of the spectral envelope of an input audio signal to a low dimension.

According to an embodiment, the second neural network may be a neural network that calculates a probability for each audio scene by analyzing one of the key features of an audio signal, that is, the shape of a spectral envelope.

Further, the electronic device 100 may calculate a probability of being at least one audio scene, based on a spectral envelope of a size adjusted by applying a predetermined weight to a spectral envelope pre-processed into the input data format of the second neural network.

For example, a dimension-reduced low-dimensional mel-scale spectral energy vector is denoted by $X_{mel}$. In this case, the size of the spectral energy vector may be adjusted by the following equation, where $w_{env}$ and $b_{env}$ are weights pre-obtained through deep learning.

$$X_{env} = w_{env} X_{mel} + b_{env}$$

Further, as illustrated in FIG. 8, the electronic device 100 may recognize an audio scene from an audio signal by using a third neural network.

The electronic device 100 may recognize an audio scene by using the third neural network, based on data preprocessed into the input data format of the third neural network, that is, data obtained by downsampling the input audio signal and converting the downsampled audio signal to a time and frequency-based spectrogram.

The third neural network may be a neural network that recognizes an audio scene from an audio signal by extracting and comparing a feature vector effective for audio scene analysis.

The feature vector may include at least one of a dominant vector, a mean spectrum power, monophony, or a spectral zero-crossing rate.

The dominant vector may be obtained by calculating a left-right channel similarity at a specific time point by using the Fourier transform result of a stereo audio signal.

The mean spectrum power may refer to the strength of an audio signal.

The monophony may refer to the degree of uniqueness of a fundamental frequency included in an audio signal at a specific time point.

The spectral zero-crossing rate may refer to a numerical representation of the frequency of a distinctive energy variation in each frequency band over time.

Figure 9:
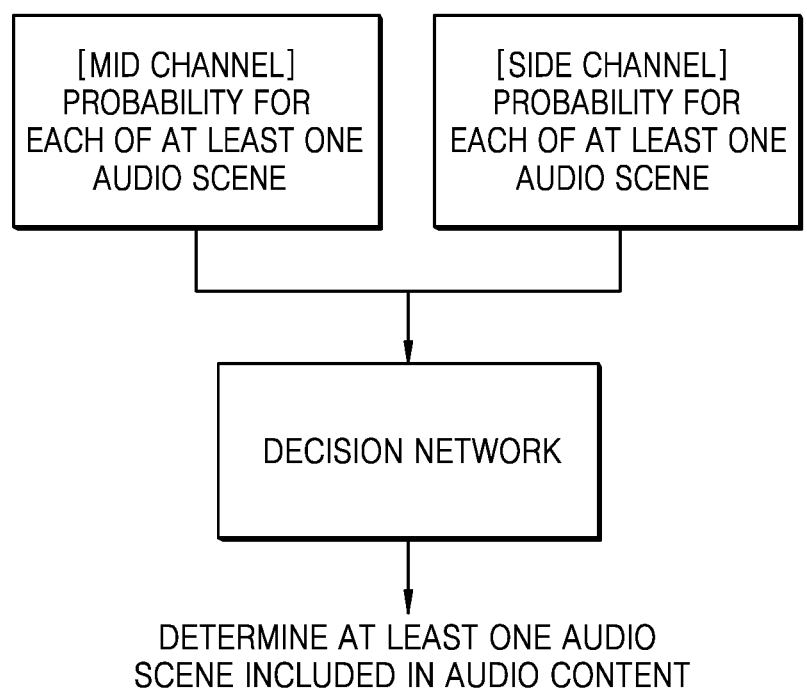
FIG. 9 is a diagram illustrating a method of determining an audio scene included in an audio signal in an electronic device, according to an embodiment.

FIG. 9 is a diagram illustrating a method of determining an audio scene included in an audio signal by an electronic device 100 according to an embodiment.

Referring to FIG. 9, the electronic device 100 may determine at least one audio scene included in audio content based on a probability for each audio scene in a mid channel and a probability for each audio scene in a side channel by using a neural network (decision network) trained to combine audio scene recognition results for respective channels.

According to an embodiment, the neural network (decision network) trained to combine audio scene recognition results for respective channels may be an RNN that combines probabilities for respective audio scenes, obtained for each of separated channels, and calculates final probabilities for the respective audio scenes in full consideration of probability estimates for a past predetermined time period.

Because the RNN models dynamic features over time, the RNN may consider past results.

Final probabilities for respective audio scenes may be calculated in consideration of all of the output values of the mid channel and the side channel by using the RNN.

Figure 10:
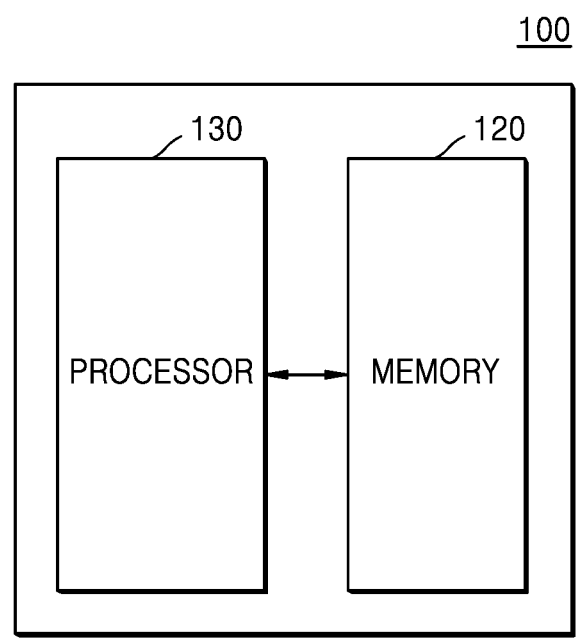
FIG. 10 is a block diagram illustrating an electronic device according to an embodiment.
Figure 11:
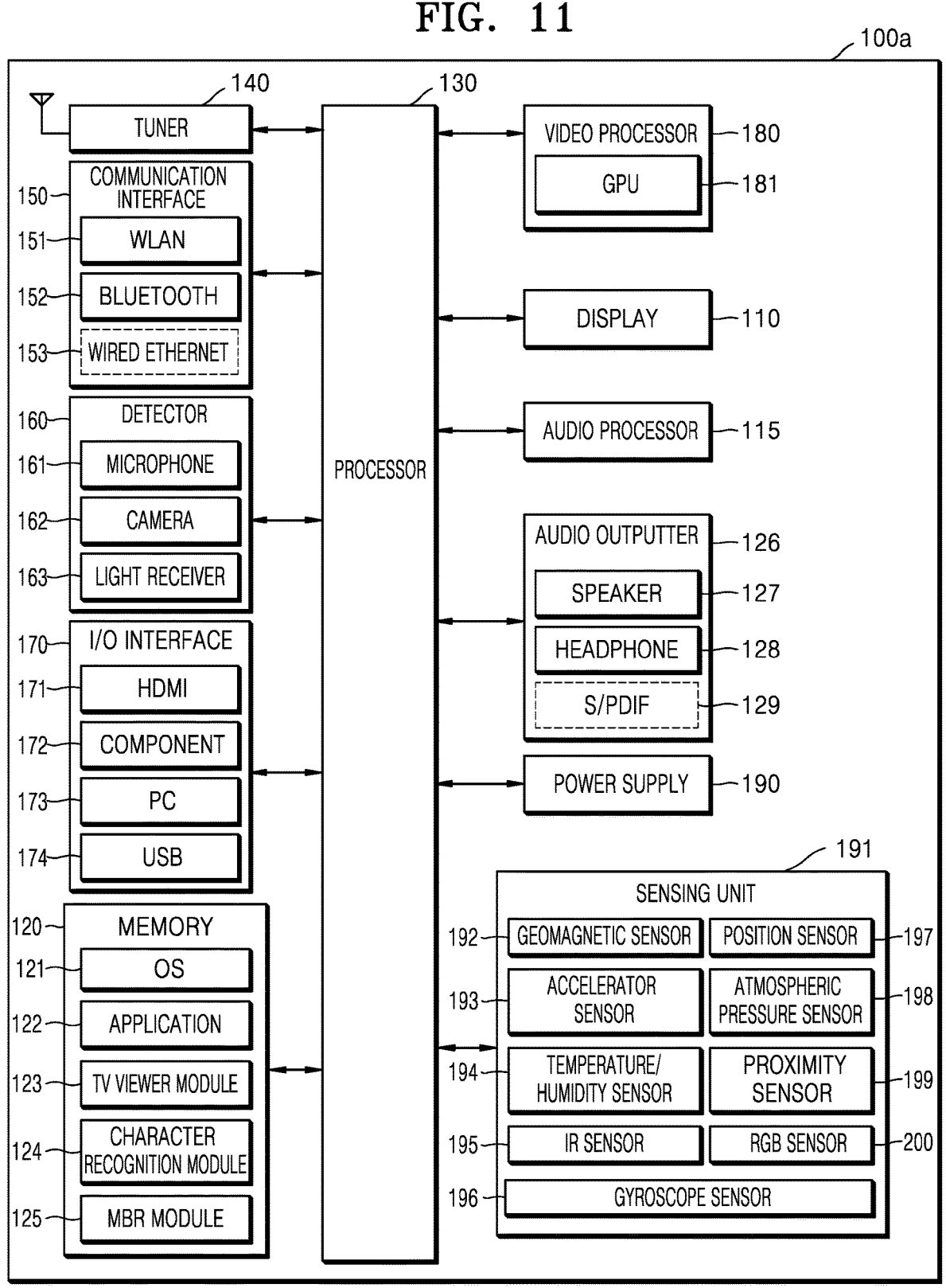
FIG. 11 is a block diagram illustrating an electronic device according to an embodiment.

FIGS. 10 and 11 are block diagrams illustrating an electronic device 100 and 100a according to one or more embodiments.

Referring to FIG. 10, the electronic device 100 may include a memory 120 and a processor 130 (e.g., at least one processor). It is understood, however, that the electronic device 100 may be implemented with more or fewer components than illustrated in FIG. 10.

For example, as illustrated in FIG. 11, the electronic device 100a according to an embodiment further include a display 110, a tuner 140, a communication interface 150, a detector 160, an input/output (I/O) interface 170, a video processor 180, an audio processor 115, an audio outputter 126, a power supply 190, and a sensing unit 191 (e.g., at least one sensor), in addition to the memory 120 and the processor 130.

Operations of the processor 130 of FIG. 10 may include the operations of the preprocessing module 201, the scene recognition module 202, and the decision module 203 illustrated in FIG. 2.

An electronic device 100a of FIG. 11 may be an embodiment of the electronic device 100 of FIG. 10.

The above components are described in detail below.

The processor 130 provides overall control to the electronic device 100, controls signal flows between internal components of the electronic device 100, and processes data. Upon receipt of a user input or when a predetermined and stored condition is satisfied, the processor 130 may execute an operating system (OS) and various applications stored in the memory 120.

The processor 130 may include a random access memory (RAM) that stores an external input signal or data or is used as a memory space for various operations performed in the electronic device 100 and 100a, a read only memory (ROM) that stores a control program for control of the electronic device 100 and 100a, and a processor.

The processor 130 may include a graphic processor (GPU) for graphical processing corresponding to a video. The processor 130 may be implemented as a system on chip (SoC) in which a core and the GPU are integrated. The processor 130 may include a single core, a dual core, a triple core, a quad core, or a multiple core thereof.

Further, the processor 130 may include a plurality of processors. For example, the processor 130 may include a main processor and a sub-processor operating in sleep mode.

According to an embodiment, the processor 130 may separate an input audio signal into channels according to a predetermined criterion. The processor 130 may separate the input audio signal into a mid channel and a side channel by executing one or more instructions stored in the memory 120. Further, the processor 130 may be configured to recognize a predetermined audio scene in each of the separated channels.

Further, the processor 130 may preprocess the input audio signal into the input data format of each of a plurality of neural networks trained to recognize an audio scene. According to an embodiment, the processor 130 may process the input audio signal into the input data formats of the first neural network and the third neural network by downsampling the input audio signal and converting the down-sampled audio signal into a time and frequency-based spectrogram. Moreover, the processor 130 may process the input audio signal into the input data format of the second neural network by reducing the dimensionality of the shape of the spectral envelope of the input audio signal to a low dimension.

Further, the processor 130 may recognize at least one audio scene from the input audio signal on a separated channel-by-channel basis by using a plurality of neural networks trained to recognize an audio scene from an audio signal. The processor 130 may calculate a probability for each of at least one audio scene on a separated channel-by-channel basis.

The processor 130 may also determine at least one audio scene included in audio content based on results of the audio scene recognition by using a neural network trained to combine audio scene recognition results for respective channels. The processor 130 may calculate a probability for each of at least one audio scene included in the audio content based on a probability for each of at least one audio scene, calculated for each of the separated mid channel and side channel.

The memory 120 may store various data, programs, and/or applications to operate and control the electronic device 100 and 100a under control of the processor 130. The memory 120 may store input/output signals or data in correspondence with operations of the video processor 180, the display 110, the audio processor 115, the audio outputter 126, the power supply 190, the tuner 140, the communication interface 150, the detector 160, and the I/O interface 170.

The memory 120 may store an OS 121 to control the electronic device 100 and 100a or the processor 130, an application provided initially by a manufacturer or downloaded from the outside, a GUI related to an application, an object (for example, at least one of an image, text, an icon, a button, or the like) to provide a GUI, user information, text, databases, or related data.

Further, the memory 120 may include a television (TV) viewer module 123 including one or more instructions to receive an input signal from a remote control and control a channel corresponding to the input signal, or when the input signal corresponds to a preset input, enter channel scroll user interface mode, a text recognition module 124 including one or more instructions to recognize information from content received from an external device, and a multi-brand remote control (MBR) module 125 including one or more instructions for channel control from an external apparatus.

The memory 120 includes a ROM, a RAM, or a memory card (for example, a micro secure digital (SD) card or a universal serial bus (USB) memory) mounted in the electronic device 100 and 100a. Further, the memory 120 may include a non-volatile memory, a volatile memory, a hard disk drive (HDD), or a solid state drive (SSD).

Also, the memory 120 may include a storage medium of at least one type of flash memory type, hard disk type, multimedia card micro type, card-type memory (for example, SD or extreme digital (XD) memory), RAM, static RAM (SRAM), ROM, electrical erasable programmable read-only memory (EEPROM), programmable read-only memory (PROM), magnetic memory, magnetic disk, or optical disk.

The display 110 displays, on a screen, a video included in a broadcast signal received through the tuner 140 under the control of the processor 130. Further, the display 110 may display content (for example, video) received through the communication interface 150 or the I/O output interface 170. The display 110 may output an image stored in the memory 120 under the control of the processor 130.

The display 110 generates a drive signal by converting an image signal, a data signal, an on-screen display (OSD) signal, a control signal, or the like processed by the processor 130. The display 110 may be implemented as a plasma display panel (PDP), a liquid crystal display (LCD), an organic light emitting diode (OLED) display, a flexible display, a cathode ray tube (CRT) display, an active matrix OLED (AMOLED), etc. Further, the display 110 may be implemented as a three-dimensional (3D) display. Additionally, the display 110 may be configured as a touch screen and thus used as both an input device and an output device.

The tuner 140 may tune to and select only the frequency of a desired channel to be received by the electronic device 100a from among multiple radio wave components through at least one of amplification, mixing, or resonance of wiredly or wirelessly received broadcast signals. A broadcast signal includes at least one of audio, video, and additional information (for example, an electronic program guide (EPG)).

The tuner 140 may receive a broadcast signal in a frequency band corresponding to a channel number according to a user input (for example, a control signal received from a remote control, such as a channel number input, a channel up-down input, and a channel selection input on an EPG screen).

The tuner 140 may receive broadcast signals from various sources such as terrestrial broadcasting, cable broadcasting, satellite broadcasting, and Internet broadcasting. The tuner 140 may also receive a broadcast signal from a source such as analog broadcasting or digital broadcasting. The broadcast signal received through the tuner 140 is decoded (for example, by audio decoding, video decoding, or additional information decoding) and divided into audio, video, and/or additional information. The audio, video, and/or additional information may be stored in the memory 120 under the control of the processor 130.

One or more tuners 140 are included in the electronic device 100a. The tuner 140 may be implemented all-in-one with the electronic device 100a, as a separate device (for example, a set-top box) equipped with a tuner electrically coupled to the electronic device 100a, or as a tuner coupled to the I/O interface 170.

The communication interface 150 may connect the electronic device 100a to an external device (for example, an audio device) under the control of the processor 130. The processor 130 may transmit or receive content to or from an external device connected through the communication interface 150, download an application from an external device, or perform Web browsing. The communication interface 150 may include at least one interface for communication methods among wireless local area network (WLAN) 151, Bluetooth 152, and wired Ethernet 153 in correspondence with the capabilities and structure of the electronic device 100a.

Further, the communication interface 150 may receive a control signal from a remote control under the control of the processor 130. The control signal may be configured as a Bluetooth type, an infrared type, a radio frequency (RF) signal type, or a wireless fidelity (WiFi) type.

Further, the communication interface 150 may further include other short-range communication (for example, near field communication (NFC) and Bluetooth low energy (BLE).

The detector 160 may detect a user's voice, a user's image, or a user's interaction, and include at least one of a microphone 161, a camera 162, and a light receiver 163.

The microphone 161 receives voice uttered by the user. The microphone 161 may convert the received voice to an electric signal and output the electric signal. The user's voice may include, for example, speech corresponding to a menu or a function of the electronic device 100a.

The camera 162 may obtain a video frame of a still image or a moving picture. An image captured through an image sensor may be processed by the processor 130 or a separate image processor.

The video frame processed in the camera 162 may be stored in the memory 120 or transmitted to the outside through the communication interface 150. According to the specification or design of the electronic device 100a, two or more cameras 162 may be provided.

The light receiver 163 receives an optical signal (including a control signal) from an external remote control. The light receiver 163 may receive an optical signal corresponding to a user input (for example, a touch input, a pressing input, a touch gesture input, a voice input, or a motion input) from the remote control. A control signal may be extracted from the received optical signal under the control of the processor 130. For example, the light receiver 163 may receive a control signal corresponding to a channel up/down button for channel switching from the remote control.

The I/O interface 170 receives video (for example, a moving picture), audio (for example, speech or music), and additional information (for example, an EPG) from the outside of the electronic device 100a under the control of the processor 130. The I/O interface 170 may include at least one of a high-definition multimedia interface (HDMI) port 171, a component jack 172, a PC port 173, or a USB port 174 The I/O interface 170 may include one or a combination of two or more of the HDMI port 171, the component jack 172, the PC port 173, and the USB port 174. An external image providing device may be connected through the HDMI port 171.

The video processor 180 processes video data received by the electronic device 100a. The video processor 180 may perform various image processes such as decoding, scaling, noise filtering, frame rate conversion, and resolution conversion, for the video data.

The GPU 181 generates a screen including various objects such as an icon, an image, and text by using a computation unit and a renderer. The computation unit calculates attribute values such as coordinates, a shape, a size, and a color to display each object according to a screen layout by using a user input detected by the detector 160. The renderer generates a screen in any of various layouts, including an object based on the attribute values calculated by the computation unit. The screen generated by the renderer is displayed in a display area of the display 110.

The audio processor 115 processes audio data. The audio processor 115 may subject audio data to various processes such as at least one of decoding, amplification, and noise filtering. The audio processor 115 may be provided with a plurality of audio processing modules to process audio corresponding to a plurality of pieces of content.

The audio outputter 126 outputs audio included in a broadcast signal received through the tuner 140 under the control of the processor 130. The audio outputter 126 may output audio (for example, speech or sound) received through the communication interface 150 or the I/O interface 170. Further, the audio outputter 126 may output audio stored in the memory 120 under the control of the processor 130. The audio outputter 126 may include at least one of a speaker 127, a headphone output terminal 128, or a SONY/PHILLIPS DIGITAL INTERFACE (S/PDIF) output terminal 129. The audio outputter 126 may include one or a combination of two or more of the speaker 127, the headphone output terminal 128, and the S/PDIF output terminal 129.

The power supply 190 supplies power received from an external power source to the internal components of the electronic device 100*a* under the control of the processor 130. Further, the power supply 190 may supply power output from one or more batteries disposed inside the electronic device 100*a* to the internal components of the electronic device 100*a* under the control of the processor 130.

The sensing unit 191 may sense a state of the electronic device 100*a* or an ambient state of the electronic device 100*a* and provide sensed information to the processor 130.

The sensing unit 191 may include at least one of, but not limited to, a geomagnetic sensor 192, an accelerator sensor 193, a temperature/humidity sensor 194, an infrared (IR) sensor 195, a gyroscope sensor 196, a position sensor (for example, a global positioning system (GPS)) 197, an atmospheric pressure sensor 198, a proximity sensor 199, or a red, green, blue (RGB) sensor (an illuminance sensor) 200.

Further, the electronic device 100*a* including the display 110 may be electrically coupled to a separate external device (for example, a set-top box) including the tuner 140.

Further, those of skill in the art will easily understand that the electronic device 100 and 100*a* may be implemented as, but not limited to, an analog TV, a digital TV, a 3D TV, a smart TV, an LED TV, an OLED TV, a plasma TV, a monitor, etc.

The illustrated block diagram of the electronic device 100 or 100*a* is for an embodiment. One or more of the components of the block diagram may be integrated, added, or omitted according to the specification of the electronic device 100 or 100*a*. That is, when needed or desired, two or more components may be integrated into one component, or one component may be separated into two or more components. Further, the function of each block is given for purpose of illustrating embodiments, and a specific operation or apparatus thereof does not limit the scope of the disclosure.

Figure 12:
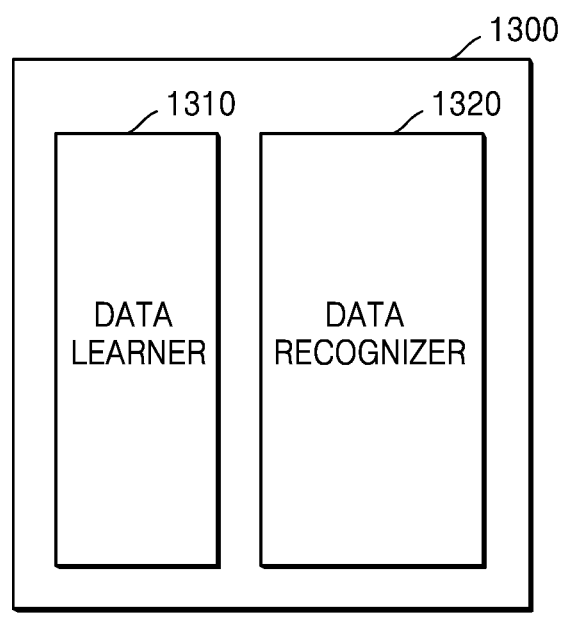
FIG. 12 is a block diagram illustrating a processor according to an embodiment.

FIG. 12 is a block diagram of a processor 1300 according to an embodiment.

The processor 1300 of FIG. 12 may be an example of the processor 130 illustrated in FIGS. 10 and 11.

Referring to FIG. 12, the processor 1300 may include a data learner 1310 and a data recognizer 1320. It is understood, however, that the components of the processor 1300 illustrated in the block diagram are not limited to a data learner 1310 and a data recognizer 1320. According to the specification or the design of the electronic device 100, the data learner 1310 and the data recognizer 1320 may be integrated, one or more of the components of the processor 1300 may be omitted, or one or more other components may be added to the processor 1300. That is, when needed or desired, two or more components may be integrated into one component, or one component may be separated into two or more components. Further, some components may be implemented as an external device connectable to the electronic device 100.

The data learner 1310 may learn a situation decision criterion. The data learner 1310 may learn a criterion as to which data is to be used for determining a certain situation, and how the situation is to be determined by using the data. The data learner 1310 may learn the situation decision criterion by obtaining data to be used for learning and applying the obtained data to a data determination model described below.

The data recognizer 1320 may determine a situation based on data. The data recognizer 1320 may recognize a situation from certain data by using a trained data determination model. The data recognizer 1320 may determine a certain situation based on certain data by obtaining the certain data according to a predetermined learning-based criterion and using the data determination model with the obtained data used as an input value. Further, a result value output from the data determination model, for the input of the obtained data used as the input value, may be used in refining the data determination model.

At least one of the data learner 1310 or the data recognizer 1320 may be manufactured in the form of a hardware chip and mounted on an electronic device. For example, at least one of the data learner 1310 or the data recognizer 1320 may be manufactured in the form of a dedicated hardware chip for artificial intelligence (AI) or as part of an existing generic-purpose processor (for example, a CPU or an application processor) or part of a graphics-only processor (for example, a GPU), and mounted on any of the electronic devices 100 and 100*a* described above.

Then, the data learner 1310 and the data recognizer 1320 may be mounted on the same or different electronic devices. For example, one of the data learner 1310 and the data recognizer 1320 may be included in an electronic device 100 or 100*a*, with the other included in a server. Further, as the data learner 1310 and the data recognizer 1320 are connected to each other wiredly or wirelessly, model information constructed by the data learner 1310 may be provided to the data recognizer 1320, and data input to the data recognizer 1320 may be provided as additional training data to the data learner 1310.

At least one of the data learner 1310 or the data recognizer 1320 may be implemented as a software module. When at least one of the data learner 1310 or the data recognizer 1320 is implemented as a software module (or a programming module including instructions), the software module may be stored in a non-transitory computer-readable medium. In this case, at least one software module may be provided by an OS or a predetermined application. Alternatively, part of the at least one software module may be provided by the OS, and the remaining part may be provided by the predetermined application.

Figure 13:
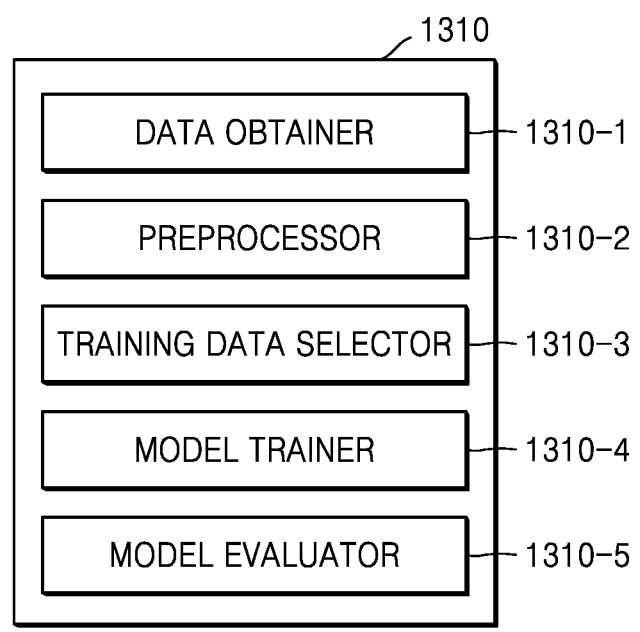
FIG. 13 is a block diagram illustrating a data learner according to an embodiment.

FIG. 13 is a block diagram illustrating a data learner 1310 according to an embodiment.

Referring to FIG. 13, the data learner 1310 may include a data obtainer 1310-1, a preprocessor 1310-2, a training data selector 1310-3, a model trainer 1310-4, and a model evaluator 1310-5.

The data obtainer 1310-1 may obtain data required or used for situation decision. The data obtainer 1310-1 may obtain data required or used for training with respect to situation decision.

According to an embodiment, the data obtainer 1310-1 may obtain audio data.

For example, the data obtainer 1310-1 may obtain audio data through an external device communicating with the electronic device.

By way of another example, the data obtainer 1310-1 may receive a moving picture through a camera of an electronic device including the data obtainer 1310 or an external camera communicating with the electronic device including the data obtainer 1310.

The camera may include one or more image sensors (for example, a front sensor or a rear sensor), a lens, an image signal processor (ISP), and/or a flash (e.g., an LED or xenon lamp).

The preprocessor 1310-2 may preprocess the obtained data, wherein the obtained data may be used in training for situation decision. The preprocessor 1310-2 may process the obtained data into a predetermined format, wherein the model trainer 1310-4 described below may use the obtained data in training for situation decision.

The training data selector 1310-3 may select data required or used for training from the preprocessed data. The selected data may be provided to the model trainer 1310-4. The training data selector 1310-3 may select data required or used for training from the preprocessed data according to a predetermined criterion for situation decision. Further, the training data selector 1310-3 may select data according to a criterion predetermined by learning of the model trainer 1310-4 described below.

The model trainer 1310-4 may learn a criterion as to how to determine a situation based on training data. Further, the model trainer 1310-4 may learn a criterion as to what training data is to be used for situation decision.

Further, the model trainer 1310-4 may train a data determination model used for situation decision by using training data. In this case, the data determination model may be a pre-constructed model. For example, the data determination model may be a model pre-constructed based on received basic training data (e.g., sample audio data).

The data determination model may be constructed in consideration of at least one of a field to which the data determination model is applied, the purpose of learning, or the computer capabilities of a device. The data determination model may be, for example, a model based on a neural network. For example, the data determination model may be, but is not limited to, a CNN, a DNN, an RNN, or a BiRNN.

According to some embodiments, in the presence of a plurality of pre-constructed data determination models, the model trainer 1310-4 may determine a data determination model with a large correlation between input training data and basic training data as a data determination model to be trained. In this case, basic training data may be pre-classified for each data type, and a data determination model may be pre-constructed for each data type. For example, basic training data may be pre-classified according to various criteria such as a region in which training data is generated, a time when the training data is generated, the genre of the training data, a generator of the training data, and the type of an object within the training data.

Further, the model trainer 1310-4 may train the data determination model by a learning algorithm including, for example, error back-propagation or gradient descent.

Moreover, the model trainer 1310-4 may train the data determination model through supervised learning in which training data is used as an input value. Also, the model trainer 1310-4 may train the data determination model through unsupervised learning in which the model trainer 1310-4 finds a criterion for situation decision by autonomously learning the type of data required or used for situation decision without being supervised. Additionally, the model trainer 1310-4 may train the data determination model through reinforcement learning using a feedback as to whether a learning-based situation decision result is right.

Further, once the data determination model is trained, the model trainer 1310-4 may store the trained data determination model. In this case, the model trainer 1310-4 may store the trained data determination model in a memory of an electronic device including the data recognizer 1320. Alternatively, the model trainer 1310-4 may store the trained data determination model in a memory of an electronic device including the data recognizer 1320 to be described below. Alternatively, the model trainer 1310-4 may store the trained data determination model in a memory of a server connected to the electronic device through a wired or wireless network.

In this case, the memory storing the trained data determination model may also store, for example, commands or data related to at least one other component of the electronic device. Further, the memory may store software and/or a program. The program may include, for example, a kernel, middleware, an application programming interface (API), and/or an application program (or "application").

The model evaluator 1310-5 may input evaluation data to the data determination model. When a recognition result output with respect to the evaluation data does not satisfy a predetermined criterion, the model evaluator 1310-5 may make or cause the model trainer 1310-4 learn again. In this case, the evaluation data may be predetermined data based on which the data determination model is evaluated.

For example, when the number or ratio of evaluation data with inaccurate recognition results among the recognition results of the trained data determination model with respect to the evaluation data exceeds a predetermined threshold, the model evaluator 1310-5 may evaluate or determine that a predetermined criterion has not been satisfied. For example, when the predetermined criterion is defined as a ratio of 2% and the trained data determination model outputs wrong recognition results for more than 20 evaluation data among a total of 1000 evaluation data, the model evaluator 1310-5 may evaluate the trained data determination model as unsuitable.

On the other hand, in the presence of a plurality of trained data determination models, the model evaluator 1310-5 may evaluate whether each trained video determination model satisfies a predetermined criterion, and determine a model satisfying the predetermined criterion as a final data determination model. In this case, when a plurality of models satisfy the predetermined criterion, the model evaluator 1310-5 may determine one model or a predetermined number of models in a descending order of evaluation scores as final data determination models.

At least one of the data obtainer 1310-1, the preprocessor 1310-2, the training data selector 1310-3, the model trainer 1310-4, or the model evaluator 1310-5 in the data learner 1310 may be manufactured in the form of at least one hardware chip and mounted on the electronic device. For example, at least one of the data obtainer 1310-1, the preprocessor 1310-2, the training data selector 1310-3, the model trainer 1310-4, or the model evaluator 1310-5 in the data learner 1310 may be manufactured in the form of a dedicated hardware chip for AI or as part of an existing generic-purpose processor (e.g., a CPU or application processor) or graphics-only processor (e.g., GPU), and mounted on any of the above-described electronic devices 100 or 100a.

Further, the data obtainer 1310-1, the preprocessor 1310-2, the training data selector 1310-3, the model trainer 1310-4, and the model evaluator 1310-5 may be mounted on the same or different electronic devices. For example, a part of the data obtainer 1310-1, the preprocessor 1310-2, the training data selector 1310-3, the model trainer 1310-4, and the model evaluator 1310-5 may be included in an electronic device 100 or 100a, whereas the remaining part may be included in a server.

Also, at least one of the data obtainer 1310-1, the preprocessor 1310-2, the training data selector 1310-3, the model trainer 1310-4, or the model evaluator 1310-5 may be implemented as a software module. When at least one of the data obtainer 1310-1, the preprocessor 1310-2, the training data selector 1310-3, the model trainer 1310-4, or the model evaluator 1310-5 is implemented as a software module (or a programming module including instructions), the software module may be stored in a non-transitory computer-readable medium. Further, in this case, at least one software module may be provided by an OS or a predetermined application. Alternatively, a part of at least one software module may be provided by the OS, and the remaining part may be provided by the predetermined application.

Figure 14:
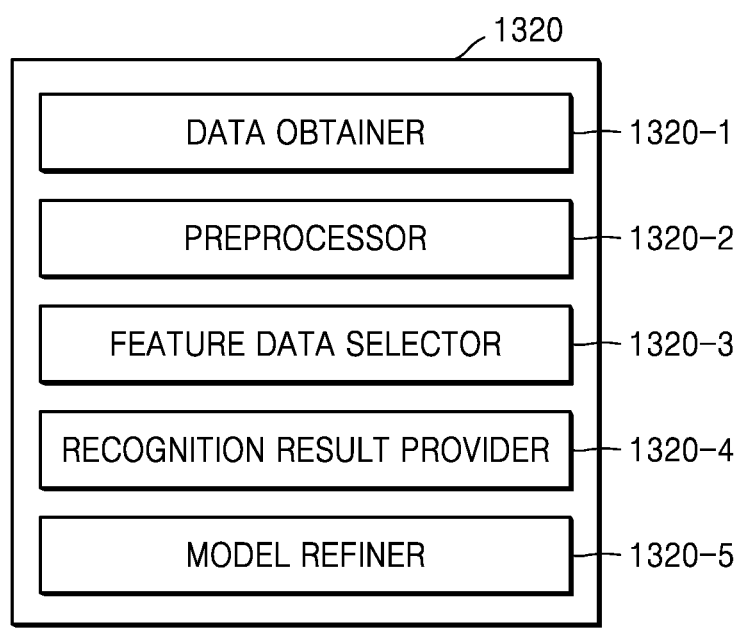
FIG. 14 is a block diagram illustrating a data recognizer according to an embodiment.

FIG. 14 is a block diagram illustrating a data recognizer 1320 according to an embodiment.

Referring to FIG. 14, the data recognizer 1320 may include a data obtainer 1320-1, a preprocessor 1320-2, a feature data selector 1320-3, a recognition result provider 1320-4, and a model refiner 1320-5.

The data obtainer 1320-1 may obtain data required or used for situation decision, and the preprocessor 1320-2 may preprocess the obtained data, wherein the obtained data may be used for situation decision. The preprocessor 1320-2 may process the obtained data into a predetermined format, wherein the recognition result provider 1320-4 described below may use the obtained data for situation decision.

The feature data selector 1320-3 may select data required or used for situation decision from the preprocessed data. The selected data may be provided to the recognition result provider 1320-4. The feature data selector 1320-3 may select all or part of the preprocessed data according to a predetermined criterion for situation decision. Further, the feature data selector 1320-3 may select data according to a criterion predetermined by learning of the model trainer 1310-4 to be described below.

The recognition result provider 1320-4 may determine a situation by applying the selected data to the data determination model. The recognition result provider 1320-4 may provide a recognition result according to the purpose of data recognition. The recognition result provider 1320-4 may apply the selected data to the data determination model by using the data selected by the feature data selector 1320-3 as an input value. Further, the recognition result may be determined by the data determination model.

The model refiner 1320-5 may refine the data determination model based on evaluation of the recognition result provided by the recognition result provider 1320-4. For example, the model refiner 1320-5 may allow the model trainer 1310-4 to refine the data determination model by providing the recognition result received from the recognition result provider 1320-4 to the model trainer 1310-4.

At least one of the data obtainer 1320-1, the preprocessor 1320-2, the feature data selector 1320-3, the recognition result provider 1320-4, or the model refiner 1320-5 in the data recognizer 1320 may be manufactured in the form of at least one hardware chip and mounted on an electronic device. For example, at least one of the data obtainer 1320-1, the preprocessor 1320-2, the feature data selector 1320-3, the recognition result provider 1320-4, or the model refiner 1320-5 in the data recognizer 1320 may be manufactured in the form of a dedicated hardware chip for artificial intelligence (AI) or as part of an existing generic-purpose processor (for example, a CPU or an application processor) or part of a graphics-only processor (for example, a GPU), and mounted on any of the above-described electronic devices 100 or 100*a*.

Further, the data obtainer 1320-1, the preprocessor 1320-2, the feature data selector 1320-3, the recognition result provider 1320-4, and the model refiner 1320-5 may be mounted on the same or different electronic devices. For example, a part of the data obtainer 1320-1, the preprocessor 1320-2, the feature data selector 1320-3, the recognition result provider 1320-4, and the model refiner 1320-5 may be included in an electronic device, with the remaining part included in a server.

At least one of the data obtainer 1320-1, the preprocessor 1320-2, the feature data selector 1320-3, the recognition result provider 1320-4, or the model refiner 1320-5 may be implemented as a software module. When at least one of the data obtainer 1320-1, the preprocessor 1320-2, the feature data selector 1320-3, the recognition result provider 1320-4, or the model refiner 1320-5 is implemented as a software module (or a programming module including instructions), the software module may be stored in a non-transitory computer-readable medium. In this case, at least one software module may be provided by an OS or a predetermined application. Alternatively, part of the at least one software module may be provided by the OS, and the remaining part may be provided by the predetermined application.

According to an embodiment, the electronic device 100 may be implemented as a device including the display (110 in FIG. 11).

According to an embodiment, the electronic device 100 may be, but not limited to, a TV. For example, the electronic device 100 may be implemented as any of various electronic devices including a desktop computer, a tablet personal computer (PC), a laptop computer, a mobile phone, an electronic book (e-book) terminal, a mobile device, a terminal for digital broadcasting, a personal digital assistant (PDA), a portable multimedia player (PMP), a navigator, a digital camera, a camcorder, an MP3 player, a wearable device, or the like. Further, the electronic device 100 may be fixed or mobile, and may be a digital broadcasting receiver configured to receive digital broadcasting.

Further, according to an embodiment, the electronic device 100 may be implemented as a curved display device with a screen having a curvature or a flexible display device with an adjustable curvature, as well as a flat display device. The output resolution of the electronic device 100 may include, for example, high definition (HD), full HD, ultra HD, or a higher resolution than ultra HD.

The devices described herein may include a processor, a memory storing program data and executing the program data, a permanent storage unit such as a disk drive, a communication port communicating with external devices, and a user interface device including a touch panel, keys, buttons, etc. When software modules or algorithms are involved, these software modules may be stored as program instructions or computer readable codes executable on a processor on a computer-readable medium. Examples of the computer-readable recording medium include magnetic storage media (e.g., ROM, floppy disks, hard disks, etc.), and optical recording media (e.g., CD-ROMs, or DVDs). The computer-readable recording medium may also be distributed over computer systems connected through a network so that the computer-readable code is stored and executed in a distributive manner. This medium may be read by the computer, stored in the memory, and executed by the processor.

One or more embodiments may be described in terms of functional block components and various processing steps. Such functional blocks may be realized by any number of hardware and/or software components configured to perform the specified functions. For example, one or more embodiments may employ various integrated circuit (IC) components, e.g., memory elements, processing elements, logic elements, look-up tables, and the like, which may carry out a variety of functions under the control of one or more microprocessors or other control devices. Similarly, where the elements are implemented using software programming or software elements, the disclosure may be implemented with any programming or scripting language such as C, C++, Java, assembler language, or the like, with the various algorithms being implemented with any combination of data structures, objects, processes, routines or other programming elements. Functional aspects may be implemented in algorithms that are executed on one or more processors. Furthermore, one or more embodiments could employ any number of techniques according to the related art for electronics configuration, signal processing and/or control, data processing and the like. The words "mechanism," "element," "means," and "configuration" are used broadly and are not limited to mechanical or physical embodiments of the disclosure. The terms may include software routines in conjunction with processors, etc.

The particular implementations shown and described herein are illustrative examples of the inventive concept and are not intended to otherwise limit the scope of the disclosure in any way. For the sake of brevity, electronics, control systems, software development and other functional aspects of the systems according to the related art may not be described in detail.

Although certain embodiments have been disclosed for illustrative purposes, those of skill in the art will appreciate that diverse variations and modifications are possible, without departing from the spirit and scope of the disclosure. Thus, the above embodiments should be understood not to be restrictive but to be illustrative, in all aspects. For example, respective elements described in an integrated form may be dividedly used, and the divided elements may be used in a state of being combined.

The use of any and all examples, or exemplary language provided herein, is intended merely to better illustrate the disclosure and does not pose a limitation on the scope of the disclosure unless otherwise claimed.

Moreover, no item or component is essential to the practice of the inventive concept unless the element is specifically described as "essential" or "critical."

Those of skill in the art will understand that the disclosure may be implemented in a different manner without departing from the essential features thereof.

Various embodiments are described with reference to the accompanying drawings. However, the scope of the disclosure is not intended to be limited to the particular embodiments, and it is to be understood that the disclosure covers various modifications, equivalents, and/or alternatives falling within the scope and spirit of the disclosure. Therefore, the above-described embodiments should be understood from an illustrative perspective, not from a restrictive perspective.

The scope of the disclosure is apparent from the claims, rather than from the detailed description of the disclosure, and the meaning and scope of the claims and all modifications or variations derived from their equivalent concept should be interpreted as falling within the scope of the disclosure.

The term "unit," "module," or the like as used herein is a unit of executing at least one function or operation, and may be implemented in hardware, software, or a combination thereof.

A "unit" or "module" may be implemented by a program stored in an addressable storage medium and executed by a processor.

For example, a "unit" or "module" may be implemented by components such as software components, object-oriented software components, class components, and task components, processes, functions, attributes, procedures, subroutines, segments of a program code, drivers, firmware, microcode, circuitry, data, database, data structures, tables, arrays, and variables.

In this specification, the recitation "A may include one of a1, a2, and a3" broadly means that an exemplary element that may be included in the element A is a1, a2, or a3.

The above recitation does not necessarily imply that an element capable of constituting the element A is limited to a1, a2 or a3. Thus, it should be noted that elements that may constitute A are not exclusively interpreted in the sense that they exclude elements other than a1, a2 and a3 which are not illustrated.

In addition, the above recitation means that A may include a1, include a2, or include a3. The above recitation does not imply that elements constituting A are essentially determined within a given set. For example, it should be noted that the above recitation should not necessarily be construed as meaning that a1, a2, or a3 selected from a set including a1, a2, and a3 constitutes component A.

In this specification, the recitation "at least one of a1, a2, and a3" means one of "a1", "a2", "a3", "a1 and a2", "a1 and a3", "a2 and a3", and "a1, a2 and a3." Therefore, unless explicitly specified as "at least one of a1's, at least one of a2's, and at least one of a3's", the recitation "at least one of a1, a2, and a3" should not be construed restrictively as meaning "at least one of a1's", "at least one of a2's", and "at least one of a3's."

What is claimed is:

1. A method of recognizing an audio scene, the method comprising:
    obtaining, according to a predetermined criterion, a mid channel and a side channel from an input audio signal;
    identifying, from the input audio signal, an audio scene probability for the mid channel and an audio scene probability for the side channel, of at least one audio scene based on audio scene recognition results for the mid channel and the side channel that are respectively obtained by using a plurality of neural networks trained to recognize an audio scene, wherein the plurality of neural networks are duplicated and applied separately on the mid channel and the side channel, to output the audio scene recognition results for the mid channel and the side channel, respectively; and
    identifying, based on the audio scene probability for the mid channel and the audio scene probability for the side channel, at least one audio scene included in audio content by using a fourth neural network trained to combine the audio scene probability for the mid channel and the audio scene probability for the side channel, wherein the fourth neural network is configured as a recurrent neural network,
    wherein the plurality of neural networks comprises:
        a first neural network trained to recognize the audio scene based on a time-frequency shape of an audio signal,
        a second neural network trained to recognize the audio scene based on a shape of a spectral envelope of the audio signal, and a third neural network trained to recognize the audio scene based on a feature vector extracted from the audio signal, and wherein the identifying the at least one audio scene further comprises:

determining a predetermined first audio scene to be recognized in the mid channel and of a predetermined second audio scene to be recognized in the side channel, the predetermined second audio scene being different from the predetermined first audio scene, and performing a recognition of the predetermined first audio scene in the mid channel and a recognition of the predetermined second audio scene in the side channel.

2. The method of claim 1, wherein the obtaining comprises preprocessing the input audio signal into an input data format of each of the plurality of neural networks trained to recognize the audio scene.

3. The method of claim 2, wherein the preprocessing comprises processing the input audio signal into the input data format of the first neural network and the input data format of the third neural network by downsampling the input audio signal and converting the downsampled audio signal into a time and frequency-based spectrogram.

4. The method of claim 2, wherein the preprocessing comprises processing the input audio signal into the input data format of the second neural network by reducing a dimensionality of the shape of the spectral envelope of the input audio signal to a lower dimension.

5. The method of claim 1, wherein the identifying the audio scene probability for the mid channel and the audio scene probability for the side channel further comprises calculating a probability of being the at least one audio scene based on a spectral envelope of a size adjusted by applying a predetermined weight to a spectral envelope preprocessed into an input data format of the second neural network, for each of the mid channel and the side channel.

6. The method of claim 1, wherein the feature vector comprises at least one of a dominant vector, a mean spectrum power, monophony, or a spectral zero-crossing rate.

7. The method of claim 1, wherein the identifying the at least one audio scene further comprises calculating a probability for each of the at least one audio scene included in the audio content based on the audio scene probability for the mid channel and the audio scene probability for the side channel.

8. An electronic device for recognizing an audio scene, the electronic device comprising:

a memory storing at least one instruction; and at least one processor configured to execute the at least one instruction to implement:

a preprocessing module configured to obtain, according to a predetermined criterion, a mid channel and a side channel from an input audio signal;

a scene recognition module configured to identify, from the input audio signal, an audio scene probability for the mid channel and an audio scene probability for the side channel, of at least one audio scene based on audio scene recognition results for the mid channel and the side channel that are respectively obtained by using a plurality of neural networks trained to recognize an audio scene, wherein the plurality of neural networks are duplicated and applied separately on the mid channel and the side channel, to output the audio scene recognition results for the mid channel and the side channel, respectively; and a decision module configured to identify, based on the audio scene probability for the mid channel and the audio scene probability for the side channel, at least one audio scene included in audio content by using a fourth neural network trained to combine the audio scene probability for the mid channel and the audio scene probability for the side channel, wherein the fourth neural network is configured as a recurrent neural network, wherein the plurality of neural networks comprises:

a first neural network trained to recognize the audio scene based on a time-frequency shape of an audio signal, a second neural network trained to recognize the audio scene based on a shape of a spectral envelope of the audio signal, and a third neural network trained to recognize the audio scene based on a feature vector extracted from the audio signal, and wherein the scene recognition module is further configured to:

determine a predetermined first audio scene to be recognized in the mid channel and a predetermined second audio scene to be recognized in the side channel, the predetermined second audio scene being different from the predetermined first audio scene, and perform a recognition of the predetermined first audio scene in the mid channel and a recognition of the predetermined second audio scene in the side channel.

9. The electronic device of claim 8, wherein the preprocessing module is further configured to preprocess the input audio signal into an input data format of each of the plurality of neural networks trained to recognize the audio scene.

10. The electronic device of claim 9, wherein the preprocessing module is further configured to process the input audio signal into the input data format of the first neural network and the input data format of the third neural network by downsampling the input audio signal and converting the downsampled audio signal into a time and frequency-based spectrogram.

11. The electronic device of claim 9, wherein the preprocessing module is further configured to process the input audio signal into the input data format of the second neural network by reducing a dimensionality of the shape of the spectral envelope of the input audio signal to a lower dimension.

12. The electronic device of claim 8, wherein the feature vector comprises at least one of a dominant vector, a mean spectrum power, monophony, or a spectral zero-crossing rate.

13. The electronic device of claim 8, wherein the decision module is further configured to calculate a probability for each of the at least one audio scene included in the audio content based on the audio scene probability for the mid channel and the audio scene probability for the side channel.

14. A non-transitory computer-readable recording medium having recorded thereon a program which, when executed by at least one processor, causes the at least one processor to perform the method of claim 1.

* * * * *